US007251274B1

(12) United States Patent
Labat et al.

(10) Patent No.: US 7,251,274 B1
(45) Date of Patent: Jul. 31, 2007

(54) MULTICHANNEL ADAPTIVE EQUALISER (75) Inventors: Joël Labat, Plougastel (FR); Christophe Laot, Plougonvelin (FR)

(73) Assignees: France Telecom, Paris (FR); Groupe des Ecoles des Telecommunications (Enst Bretagne), Paris (FR)

(*) Notice: Subject to any disclaimer, the term of this patent is extended or adjusted under 35 U.S.C. 154(b) by 590 days.

(21) Appl. No.: 10/148,142

(22) PCT Filed: Nov. 24, 2000

(86) PCT No.: PCT/FR00/03282

§ 371 (c)(1),
(2), (4) Date: Sep. 3, 2002

(87) PCT Pub. No.: WO01/39446

PCT Pub. Date: May 31, 2001

(30) Foreign Application Priority Data

Nov. 25, 1999 (FR) .................................. 99 14844

(51) Int. Cl.
*H03H 7/30* (2006.01)
*G06F 17/10* (2006.01)
(52) U.S. Cl. ...................... 375/232; 375/234; 708/319; 708/320
(58) Field of Classification Search ........ 375/229–230, 375/232–235; 708/319–320, 322–323
See application file for complete search history.

(56) References Cited

U.S. PATENT DOCUMENTS 4,696,015 A * 9/1987 Palicot et al. ............... 375/232
5,335,251 A 8/1994 Onishi et al.
5,513,214 A 4/1996 Gozzo
5,909,466 A * 6/1999 Labat et al. ................ 375/233
6,314,147 B1 * 11/2001 Liang et al. ................ 375/346
2004/0264610 A1 * 12/2004 Marro et al. ............... 375/347

FOREIGN PATENT DOCUMENTS

EP 0725497 8/1996
FR 2738967 3/1997

OTHER PUBLICATIONS

Albonico, D. et al., "Test of high data rate acoustic link in shallow water", IEEE Oceanic Engineering Society. Oceans '98. pp. 1028-1032, vol. 2.
Labat J., et al. "Adaptive Decision Feedback Equalization: Can You Skip the Training Period?", IEEE Transactions on Communications, pp. 921-930, vol. 46, No. 7, Jul. 1, 1998.

(Continued)

*Primary Examiner*—Young T. Tse
(74) *Attorney, Agent, or Firm*—Blakely Sokoloff Taylor & Zafman (57) ABSTRACT

An equalizer device is used for digital communications systems having a plurality of receive channels. The equalizer device in normal operation comprises a transversal filter for each receive channel, an adder for summing the receive channels, and a system downstream from the adder including a phase corrector and a recursive portion including a single recursive filter and decision circuit in its forward branch. The equalizer device including decision-taking circuit for evaluating its performance as a function of the output signal from the equalizer device and for responding to the result of this evaluation by switching from a first structure which corresponds to a normal mode of operation to a second structure which corresponds to a convergence mode of operation, and vice versa.

13 Claims, 8 Drawing Sheets

OTHER PUBLICATIONS

Labat J., et al. "Blind decision Feedback equalization application to underwater communication systems", IEEE Oceanic Engineering Society, Oceans '98, pp. 805-809, vol. 2.

Labat J. et al., "Is Training of Adaptive Equalizers still Useful?", IEEE Vehicular Technology Conference, Nov. 18, 1996, pp. 968-972.

Mottier D., et al, "Self-Adaptive Decision Feedback Equalization: Application to High-Order QAM Signals", Proceedings of ICC'97, pp. 1100-1104, vol. 2.

Despins, C.L.B., et al., "Compound Strategies of Coding, Equalization, and Space Diversity for Wide-Band TDMA Indoor Wireless Channels", IEEE Transactions on Vehicular Technology, pp. 369-370, Nov. 1, 1992.

Nagayasu, T. et al, "Performance of 16QAM With Decision Feedback Equalizer Using INterpolation for Land Mobile Communications", pp. 384-387, May 10, 1992.

1999 IEEE, "Blind Spatio-Temporal Decision Feedback Equalization a Self-Adaptive Approach", J. Labat, et al., pp. 2301-2305.

"Automatic Equalization for Digital Communication," by R.W. Lucky; *The Bell System Technical Journal*, vol. XLIV, Apr. 1965, No. 4, pp. 547-589.

"Decision Feedback Equalization," by Carlos A. Belfiore, et al.; *Proceedings of the IEEE*, vol. 67, No. 8, Aug. 1979, pp. 1143-1156.

"Maximum-Likelihood Sequence Estimation of Digital Sequences in the Presence of Intersymbol Interference," by G. David Forney, Jr.; *IEEE Transactions on Information Theory*, vol. IT-18, No. 3, May 1972, pp. 363-378.

"The Viterbi Algorithm," by G. David Forney, Jr.; *Proceedings of the IEEE*, vol. 61, No. 3, Mar. 1973, pp. 268-278.

"A Method of Self-Recovering Equalization for Multilevel Amplitude-Modulation for Multilevel Amplitude-Modulation Systems," by Yoichi Sato; *IEEE Transactions on Communications*, Jun. 1975, pp. 679-682.

"Self-Recovering Equalization and Carrier Tracking in Two-Dimensional Data Communication Systems," by Dominique N. Godard; *IEEE Transactions on Communications*, vol. COM-28, No. 11, Nov. 1980, pp. 1867-1875.

"Blind Equalizers," by Albert Benveniste, et al.; *IEEE Transactions on Communications*, vol. COM-32, No. 8, Aug. 1984, pp. 871-883.

"New Criteria for Blind Deconvolution of Nonminimum Phase Systems (Channels)," by Ofir Shalvi, et al.; *IEEE Transactions on Information Theory*, vol. 36, No. 2, Mar. 1990, pp. 312-321.

"An Adaptive Nonlinear IIR Filter For Self-Learning Equalization," by Carlos Aurelio Faria Da Rocha; *1994 IEEE*, pp. 6-10.

"Blind Equalization of Digital Communicaiton Channels Using High-Order Moments," by Boaz Porat, et al.; *1991 IEEE*, pp. 522-527.

"New Class of Zero-Forcing Cost Functions in Blind Equalization," by Victor Shtrom, et al.; *IEEE Transactions on Signal Processing*, vol. 46, No. 10, Oct. 1998, pp. 2674-2683.

"Adaptive Decision Feedback Equalization: Can You Skip the Training Period?" by Joel Labat, et al.; *IEEE Transactions on Communications*, vol. 46, No. 7, Jul. 1998, pp. 921-930.

\* cited by examiner

FIG_1
Prior Art

FIG_2
Prior Art

FIG_3
Prior Art

FIG_4
Prior Art

FIG_5

FIG_6

Prior Art

FIG_7

FIG_8

FIG_9

FIG_10

FIG_11

FIG_12

FIG_13

FIG_14

FIG_15

FIG_16

FIG_17

FIG_18

FIG_19

FIG_20

FIG. 21

MULTICHANNEL ADAPTIVE EQUALISER

DESCRIPTION OF THE GENERAL FIELD OF THE INVENTION AND OF THE STATE OF THE ART

The present invention relates to equalizer devices (or "equalizers") for receivers in multichannel digital communications systems.

In present communications systems, receivers perform various functions including demodulation, i.e. shifting the received signal into baseband, equalization, synchronization (clock rate and carrier), decision-making, and channel decoding.

In its time domain version, equalization consists essentially in reducing intersymbol interference (ISI), a phenomenon which is associated with the fact that overall the communications system does not satisfy the so-called "Nyquist" criterion. This can be the result of a poor filtering strategy, of a poor choice for the sampling instant, or from a phenomenon of multiple path propagation. This applies in particular to mobile radio channels, to ionospheric or tropospheric channels, and to undersea sound channels.

For reference, it is recalled that a communications system can be modelled as being a source delivering discrete symbols having values that are taken from an alphabet of finite size, and transmitting them at a rate 1/T over an equivalent discrete channel. The rate is known as the speed of modulation and is expressed in bauds, where T designates the time interval between the transmission of two successive symbols.

Historically, the first devices for combating the ISI phenomenon were introduced by Lucky in the publication:

[1] R. W. Lucky, "Automatic equalization for digital communications", BSTJ 44, pp. 547-588, April 1965.

That device essentially comprises linear transversal filters that are "synchronous" (using a single sample per symbol duration), and adaptive, where adaptability is needed because of the way the transmission channel varies over time. The filter coefficients were updated using a criterion of minimizing noise under the constraint of zero ISI (known as zero forcing), this procedure leading to the folded spectrum being "equalized", hence the terminology used.

Figure 1:
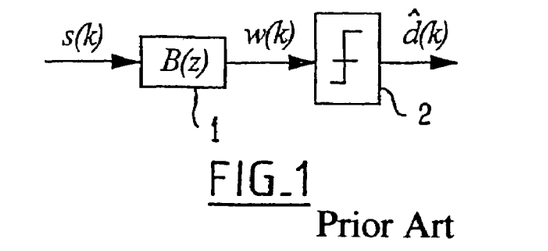
FIG. 1 is a block diagram of a linear transversal time equalizer.

FIG. 1 constitutes a block diagram showing the principle of a transversal filter, where a filter 1 is represented having a transfer function B(z), together with a decision circuit, referenced 2 and situated downstream from said filter 1.

It was only subsequently that adaptive equalizers appeared using minimizing the mean quadratic error (MQE) as the optimizing criterion. With difficult channels, it turned out that forcing zero ISI could lead to a large increase in output noise from the equalizer, thereby contributing to severe degradation in performance, whereas, in contrast, the criterion of minimizing MQE turned out to provide a judicious compromise that achieves a significant reduction in IST without greatly increasing noise.

From a general point of view, adaptive equalization has conventionally been performed in two stages. During the first stage, the device is operated using a training sequence of sufficient length to guarantee convergence, and then during the second stage it becomes self-adaptive, i.e. it controls itself on the basis of its own decisions, with all of the risks that are inherent to that strategy.

Figure 2:
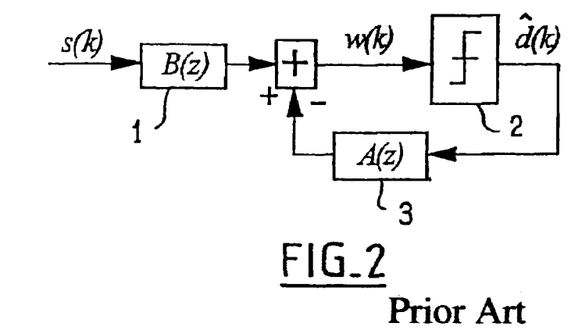
FIG. 2 is a block diagram of a decision feedback time equalizer.

Still more recently, proposals have been made in the publication:

[2] C. A. Belfiore, J. H. Park, "Decision feedback equalization", Proceedings of the IEEE 67 (8), August 1979, for non-linear recursive decision feedback equalizers in which, as shown in FIG. 2, decided data is reinjected into a feedback filter 3 having a transfer function written A(z), and constituting the recursive proton of the filter.

That approach enables performance to be achieved that is quite clearly better than the performance obtained using a linear equalizer. Unfortunately, those devices can also turn out to be extremely sensitive to decision errors, so much so that an error propagation phenomenon will sometimes occur, and can go to the extent of causing the device to diverge so that its output no longer has any pertinence relative to the transmitted data.

Under such conditions, it is therefore necessary to supervise the device periodically, thereby giving rise at the very least to a significant reduction in spectrum efficiency.

In other words, the behavior of the device must be monitored periodically (or better still continuously) so as to prevent the equalizer from operating pathologically.

A general object of the invention is to propose a technique enabling that problem to be solved in elegant manner.

From another point of view, although it is true that a decision feedback equalizer (DFE) is not optimal relative to the criterion of minimizing the probability of error (equivalent to the a posteriori maximum criterion), it nevertheless remains that the optimum receiver described in:

[3] G. D. Forney, Jr., "Maximum likelihood sequence estimator of digital sequences in the presence of intersymbol interference", IEEE Trans. on Information Theory, Vol. IT-18n, pp. 6363-6378, May 1972, quickly becomes impossible to achieve when the length of the impulse response becomes large. Such a device begins by estimating the impulse response of the transmission channel and then searches through all possible transmitted sequences for the sequence that would be output from the channel as estimated in this way with the (vector) signal closest to the genuinely available (vector) observation.

At present, implementing such receivers makes use of the Viterbi algorithm as described in:

[4] G. D. Forney, Jr., "The Viterbi algorithm", Proc. IEEE, Vol. 61, pp. 268-278, March 1973, whose major advantage is that it enables decisions to be taken "on the fly" without loss of optimality. In other words, it is not necessary for a message to be received in full before beginning to make decisions concerning the most likely sequence of symbols.

Nevertheless, and by way of example, for a signal modulated with four phase states, transmitted over a channel having a discrete impulse response of length 15 (time spreading of order 15 T), the trellis associated with such a system has one billion possible states which, de facto, makes that type of receiver a practical impossibility, at least in real-time applications. In some applications, such time spreading is commonplace, as applies to undersea sound channels, to ionospheric channels, and to telephone lines (twisted pairs), and this can apply, from the general point of view, to any transmission channel in the event of a significant increase in data rate within the allocated band.

It is clear that attempts are always being made to carry higher and higher data rates over channels of this type, which leads inexorably to a lengthening of the time span of the impulse response. It is in this sense that decision feedback equalizers constitute an advantageous alternative to optimal receivers once the discrete impulse response is large in size. Thus, with the present GSM standard mobile radio communications, time spreading is of the order of 6 T, which for binary modulation represents 64 states and thus lends itself well to using an optimal reception technique. If there should now be a change to quaternary modulation for obvious reasons of increasing in-line data rates, and if it should also be desired to increase modulation speed by a factor of 2, then the number of states would be of the order of 17 million, which is clearly prohibitive. That is why decision feedback equalizers (DFEs), although theoretically suboptimal, present a clear major advantage in terms of compromise between complexity and performance, providing nevertheless that potentially pathological performance can be kept under control.

As mentioned above, the method conventionally used on difficult channels consists in periodically transmitting a training sequence so as to be in a position to reset the DFE, where necessary. This is detrimental to spectrum efficiency which can then be severely affected. That is the fundamental reason behind the large amount of work presently being carried out on blind equalization (self-learning, non-supervised). The objective is to cause the device to converge on its optimum solution without using training sequences, i.e. to do so specifically on the basis solely of statistical knowledge about the signal transmitted from the source. Several authors have provided non-negligible contributions on this topic, including the following:

[5] Y. Sato, "A method of self-recovering equalization for multilevel amplitude modulation", IEEE Trans. on Com., COM-23, pp. 679-682, June 1975;
[6] D. N. Godard, "Self-recovering equalization and carrier tracking in two-dimensional data communication systems", IEEE Trans. on Com., COM-28, pp. 1867-1875, November 1980;
[7] A. Benveniste, M. Goursat, "Blind equalizers", IEEE Trans. on Com., Vol. 32, 1984, pp. 871-883;
[8] O. Shalvi & E. Weinstein, "New criteria for blind deconvolution of non-minimum phase systems (channels), IEEE Trans. on IT, Vol. 36, No. 2, March 1990, pp. 312-321;
[9] C. A. F. Da Rocha, O. Macchi and J. M. T. Romano, "An adaptive non-linear IIR filter for self-learning equalization", ITC 94, Rio de Janeiro, Brazil, pp. 6-10, 1994;
[10] B. Porat, B. Friedlander, "Blind equalization of digital communication channels using high order moments", Trans. on SP, Vol. 39, pp. 522-526, February 1991; and
[11] V. Shtrom & H. Fan, "New class of zero-forcing cost functions in blind equalization", IEEE Trans. on SP, Vol. 46, No. 10, October 1998, pp. 2674-2683.

All of those algorithms make implicit reference to statistics of order greater than two. This is associated with the fact that such moments need to be used in order to invert a minimum phase channel. The first equalizers of that type were generally linear and transversal, i.e. they had finite impulse response.

Very recently, a solution that is elegant and particularly effective has been put forward by Labat et al. in:

[12] J. Labat, C. Laot & O. Macchi, "Dispositif d'égalisation adaptatif pour systèmes de communications numériques" [An adaptive equalizer device for digital communications systems], French patent No. 95/10832;
[13] J. Labat, O. Macchi & C. Laot, "Adaptive decision feedback equalization: can you skip the training period?", IEEE Trans. on Com., Vol. 46, No. 7, pp. 921-930, July 1998.

Figure 3:
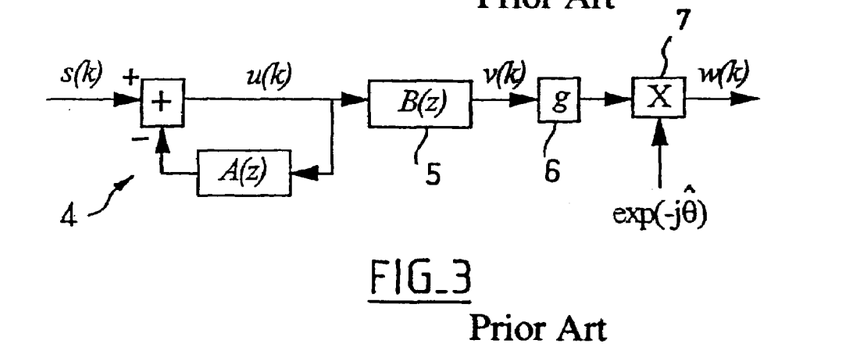
FIG. 3 is a diagram showing the structure of a previously-proposed time equalizer [12] in convergence mode.
Figure 4:
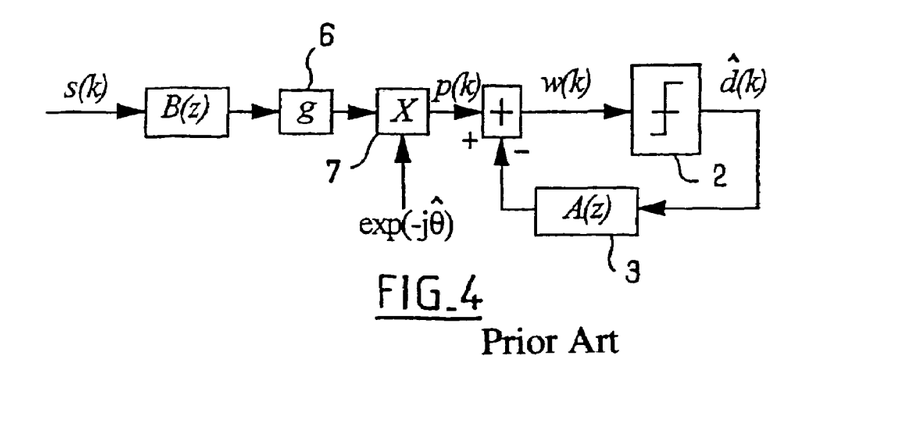
FIG. 4 is a diagram which shows the structure of the same time equalizer in tracking mode.

That new time equalizer, whose description is summarized below, has two modes of operation that are adapted to the severity of the transmission channel. In an initial mode, referred to as the "convergence" mode and shown in FIG. 3, the device is constituted by a cascade connection of a purely recursive whitening filter 4, a transversal filter 5, automatic gain control (AGC) 6, and a phase corrector 7. The originality of the device is associated with the fact that each stage is adapted using a specific criterion, thus conferring both robustness and speed to convergence. Once the equalization process has advanced sufficiently, which can be assessed by examining the mean quadratic error (MQE) as estimated on the basis of decisions taken by the receiver, the structure and the criteria for adapting the equalizer are modified so that the device becomes a decision feedback equalizer (DFE) of conventional type (FIG. 4). The reversible nature of this modification gives the new equalizer a substantial advantage in that, whenever possible, it takes advantage of its own decisions without any risk of divergence, contrary to conventional DFEs. If transmission conditions should change suddenly, then the novel equalizer returns to its initial configuration, thus enabling it to readapt to the new situation. Under such conditions, the question of selecting between a linear device and a DFE type equalizer does not really arise since the novel equalizer is always capable of selecting the configuration that enables it to achieve the better performance.

SUMMARY OF THE INVENTION

An object of the invention is to propose a multichannel equalizer, in particular a space-time equalizer (i.e. an equalizer capable of making use of signals picked up simultaneously by a plurality of sensors in parallel), that presents particularly good performance.

To this end, the invention provides an equalizer device for digital communications systems having a plurality of receive channels, the device presenting in normal operation a structure which comprises means forming a transversal filter for each receive channel, summing means for summing the various channels, and a system downstream from said summing means including phase correction means and a purely recursive filter including decision means in its forward branch, said equalizer device including decision-taking means for evaluating its performance as a function of the output signal from said device and for responding to the result of this evaluation by switching from the structure which corresponds to a normal mode of operation, also referred to as tracking mode or easy reception mode, to the structure which corresponds to a convergence mode of operation, also referred to as difficult reception mode, and vice versa, the device being characterized in that in convergence and/or difficult reception mode, it presents a structure which includes a purely recursive filter in each of the receive channels, the purely recursive filter being omitted from the system downstream from the summing means.

Such a device is advantageously associated with the various characteristics below taken singly or in any technically feasible combination:

it includes means for modifying its criteria for updating the transversal and recursive portions of the device depending on whether it is operating in normal mode or in convergence or difficult reception mode;

in convergence or difficult reception mode, the recursive filters are updated using a quadratic criterion, the transversal filters being updated using a statistical criterion of order greater than 2;

it includes means for controlling it in tracking or easy reception mode in such a manner as to minimize the estimated mean quadratic error;

its performance level is determined as a function of an estimate of mean quadratic error;

in convergence mode, the phase correction means are disposed in the immediate vicinity of the decision-taking means;

it includes automatic control gain means;

in tracking or easy reception mode, the automatic gain control means are constituted by the means constituting the transversal filters; and in convergence mode, the automatic gain control means are situated upstream from the recursive filters.

The invention also provides a fractionally-spaced type equalizer device in which the received data is fractionally-spaced over a plurality of channels, the device being characterized in that it is constituted by a device of the above specified type.

The invention also provides a continuous stream data transmission system or a packet transmission system characterized in that it includes an equalizer device of the above-specified type.

Such a space-time equalizer is self-learning with decision feedback and of variable configuration. As a function of a signal generated in line, such as the estimated mean quadratic error, or the kurtosis of the output signal from the equalizer, or more generally any relevant cost function (Godard [6], Shalvi & Weinstein [8], Shtrom & Fan [11], . . . ), the equalizer configures itself in a manner that is "optimum" in terms of its structure and of optimization criteria. In its initial operating mode, referred to as "convergence" mode, the device is linear and recursive, whereas in its normal operation mode, referred to as "tracking" mode, the device becomes a conventional space-time DFE controlled by its own decisions. Switching from one of these two configurations to the other is entirely reversible, which makes it particularly attractive with channels that are not steady. As a result, the device proposed by the invention makes it possible to achieve performance that is most advantageous both in terms of convergence and in terms of tracking. This essential property enables it to adapt to channel fluctuations in severe situations, unlike conventional equalizers of the prior art. From this point of view, the device proposed by the invention is particularly adapted to channels that are not steady such as mobile radio channels, ionospheric channels, tropospheric channels, and undersea sound channels.

BRIEF DESCRIPTION OF THE FIGURES

Other characteristics and advantages of the invention appear further from the following description. This description is purely illustrative and non-limiting. It should be read with reference to the accompanying drawings, in which.

DESCRIPTION OF EMBODIMENTS OF THE INVENTION

General Description

Figure 5:
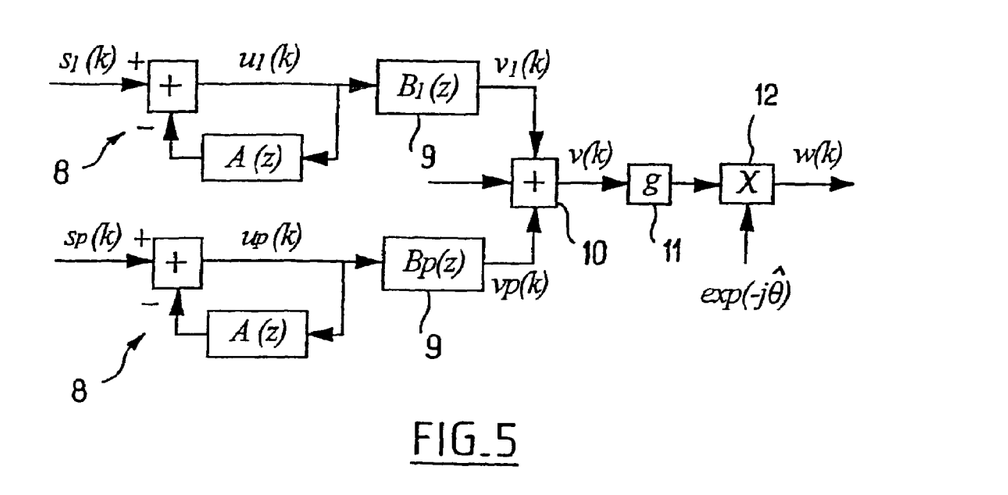
FIG. 5 is a diagram showing the convergence mode structure of a space-time equalizer in accordance with a possible embodiment of the invention.

The multichannel equalizer device proposed by the invention presents two different structures depending on whether it is in convergence mode (mode 1) or in tracking mode (mode 2), i.e. under normal operating conditions. These two structures are shown in FIGS. 5 and 6.

In the structure used during convergence mode (FIG. 5), a purely recursive filter 8 precedes a transversal filter 9 on each of P receive channels used by the space-time equalizer. Further downstream, after the summing circuit 10, there are to be found both automatic gain control 11 and phase correction 12. All of these elements are adapted on the basis of "blind" criteria, i.e. criteria not requiring any knowledge concerning the transmitted data, other than a priori knowledge about its statistical properties.

Figure 6:
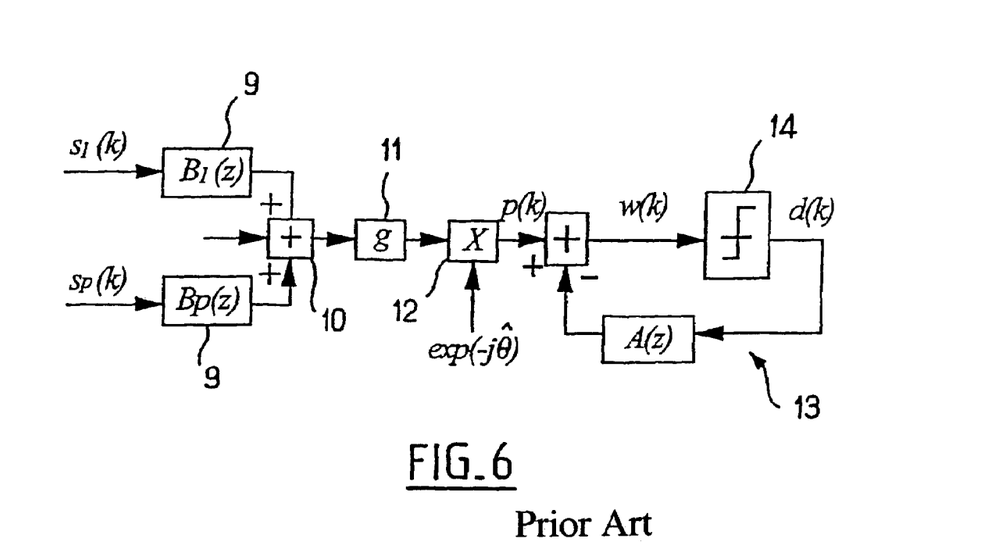
FIG. 6 is a diagram which shows the tracking mode structure of a space-time equalizer in accordance with a possible embodiment of the invention.

In tracking mode, the positions of the transversal and recursive filters are modified so that the device is configured as a conventional space-time DFE (FIG. 6). The overall optimization criterion then becomes that of minimizing the estimated mean quadratic error (MQE). In this mode of operation, the AGC is generally inhibited, i.e. locked on the value it had prior to changing structure. Thus, when the structure is modified, the optimization criteria are changed in parallel. Depending on the severity of the channel, and using a signal generated in line for measuring the performance of the device, such as the quadratic error, or the kurtosis (cumulative, order 4), or the output signal w(k), or any other in-line estimated cost function (Godard [6], Shalvi & Weinstein [8], Shtrom & Fan [11], . . . ), the device switches from a linear self-learning recursive structure as shown in FIG. 5 to a non-linear space-time DFE structure as shown in FIG. 6, or conversely form the decision-controlled DSE type structure to a linear self-learning recursive structure. The corresponding structures are described below both in convergence mode and in tracking mode.

Naturally, in convergence mode, since the device is linear, the positions of the various elements constituting the space-time DFE can be modified. This modification relates in particular to the AGC which can be placed at several locations within the system, and could possibly even be omitted (which amounts to setting g=1), in which case the transversal filters take on the AGC function. Thus, in illustrative but non-limiting manner, the AGC can be situated directly upstream or downstream from the phase corrector, or indeed upstream or downstream from the purely recursive filter. Although from a purely theoretical point of view it is possible for the phase corrector that performs the carrier recovery function to be situated anywhere in the system, it is clear that its ideal position lies in the immediate vicinity of the decision circuit. This is associated with the criterion generally used for adaptation, namely minimizing the estimated mean quadratic error. Nevertheless, other more robust techniques using techniques available in the present art could also be used.

1) Mode 1: Convergence Mode and/or Periods in which Reception is Difficult

The structure corresponding to the convergence configuration shown in FIG. 5 has P receive channels corresponding to P antenna sensors, with each channel including an identical purely recursive filter 8 of transfer function $1/[1+A(z)]$ and transversal filter 9 of respective transfer function $B_i(z)$ for i=1, 2, ..., P, and also has a summing circuit 10, an automatic gain control device 11, and a phase corrector 12.

A priori, the respective positions of the AGC and of the phase corrector (carrier recovery) is of no importance theoretically, at least in a non-adaptive strategy. Thus, the AGC (characterized by g) can be situated upstream or downstream from the purely recursive filters or indeed upstream or downstream from the phase correction device, and it can even be omitted. One suitable position is that shown in FIG. 5.

The gain g of the device 11 is updated using a blind criterion, since recursive filters on a quadratic criterion and transversal filters on a single criterion imply statistics of order greater than 2. To update the coefficients of the transversal filters, several algorithms can be used, and in particular those of Godard [6], Shalvi & Weinstein [8], Shtrom & Fan [11], etc.

Recovering the carrier or correcting phase, i.e. estimating phase error and compensating it by complex multiplication by $\exp(-j\hat{\theta})$ is performed, for example, using a criterion of minimizing estimated mean quadratic error. The resulting error signal can then be filtered so as to drop back to a second order device (or to a device of order greater than 2 should that be necessary). The device can likewise be situated at various positions in the system because of its linearity. Nevertheless, in practice, at least for the criterion under consideration, it appears to be judicious to situate it downstream from the equalizer. In this convergence mode, phase correction can be controlled by decisions, even though it is also possible to envisage using other criteria that are more robust, taking advantage of the symmetry of the transmitted signal constellation. In any event, the other functions are optimized on the basis of criteria that do not rely in any way on decisions taken by the appropriate device (threshold circuit). Consequently, this first step is entirely self-learning (blind, not supervised). In addition, each of its component devices possesses an appropriate optimization criterion, thereby conferring a very robust nature to the device as a whole.

2) Mode 2: Tracking Mode and/or Periods of Easy Reception

Once the channel has been almost equalized, as can be deduced by observing the estimated MQE, the kurtosis, or any other cost function (Godard [6], Shalvi & Weinstein [8], Shtrom & Fan [11], ...), the purely recursive linear filters 8 having the transfer function $1/[1+A(z)]$ are replaced by a single filter 13 having the same transfer function which is positioned differently as shown in FIG. 6, and which is now fed with the decisions $\hat{d}(k)$ taken by the decision circuit of the device, which decision circuit is referenced 14. Clearly, implementing this function makes it necessary in convergence mode 1 to have identical recursive filters on all P channels of the space-time DFE. The resulting new structure is that of a conventional space-time DFE controlled by decisions using the criterion of minimizing estimated mean quadratic error. In addition, if the likelihood of a decided data item is judged to be low, it is then possible to chose to reinject the signal w(k) at the input of the decision circuit into the filter A(z) instead of and replacing the decided data item $\hat{d}(k)$.

It is considered that it is better, temporarily, to inject noisy data w(k) into the recursive filter A(z) than it is to take the risk of injecting decided data $\hat{d}(k)$ therein which is of low likelihood (and thus probably wrong). This way of proceeding can make the device more robust in tracking mode and, in this respect, it constitutes a potential improvement of the space-time DFE. Furthermore, in this tracking mode, the AGC can be integrated in the transversal filters $B_i(z)$ by locking g on its preceding value.

It will thus be understood that the space-time equalizer presents two different operating modes associated with different structures and optimization criteria.

One of the essential characteristics of the novel device is that this structural modification is entirely reversible. Such a property is advantageous and makes it possible under severe conditions to return to convergence mode, i.e. to a mode of operation that is very robust. In contrast, once the severity of the channel diminishes, this gives rise to a diminution in the associated mean quadratic error, and the system switches back to tracking mode, i.e. to an equalizer of decision feedback structure, and so on. In this respect the device presents a characteristic which is original and particularly attractive.

In parallel with this structural switching, the criteria used for updating the coefficients of the transversal and recursive portions are changed. In mode 1, these criteria rely exclusively on a priori knowledge about statistics of the signal transmitted by the source, whereas in tracking mode the optimization criterion is that of minimizing estimated MQE.

Detailed Description of an Embodiment

There follows a detailed description of an embodiment of the space-time equalizer device of the invention.

1) Convergence Mode and/or Periods of Difficult Reception 1.1—Operating Equations The equations governing the operation of the device are the following: for i=1, 2, ..., P, the following apply:

$$u_i(k) = s_i(k) - \sum_{l=1}^{N} a_l u_i(k-l) = s_i(k) - A^T U_{i,N}(k) \qquad \text{I-1}$$

where $s_i(k)$ designates the signal at the input of channel $i$ at time $k$, $u_i(k)$ designating the signal output by the filter 8 in channel $i$, and where:

$$A = [a_1, a_2, \ldots, a_N]^T \qquad \text{I-2}$$

$$U_{i,N}(k) = (u_i(k-1), u_i(k-2), \ldots, u_i(k-N))^T \qquad \text{I-3}$$

The following also applies:

$$v_i(k) = \sum_{l=0}^{L} b_{i,l} u_i(k-l) = B_i^T U_{i,L+l}(k) \qquad \text{I-4}$$

where $v_i(k)$ designates the output signal from the transversal filter 9 of channel $i$ and where:

$$U_{i,L+1}(k) = (u_i(k), u_i(k-1), \ldots, u_i(k-L))^T \qquad \text{I-5}$$

$$B_i = [b_{i,0}, b_{i,1}, \ldots, b_{i,L}]^T \qquad \text{I-6}$$

and also:

$$v(k) = \sum_{i=1}^{P} \sum v_i(k) \qquad \text{I-7}$$

$$w(k) = v(k) g(k-1) \exp[-j\hat{\theta}(k-1)] \qquad \text{I-8}$$

By way of example, the vectors $B_i$ can be initialized with $B_i(0) = [0, 0, \ldots, 1/P, 0, 0]^T$ and $C(0)$ is the zero vector of dimension N.

1.2—Updating Parameters in Convergence Mode

1.2.1—Purely Recursive Filter

The optimization criterion used for adapting the recursive filter is minimizing the following cost function:

$$E\{|u_1(k)|^2 + \ldots + |u_p(k)|^2\} = \sum_{i=1}^{P} E\{|u_i(k)|^2\} \qquad \text{I-9}$$

This can be done using an algorithm technique of the recursive least squares type or of the "stochastic gradient" type. The updating equation given below comes from the stochastic gradient algorithm:

$$A^T(k) = A^T(k-1) + \mu_a \sum_{i=1}^{P} u_i(k) U_{i,N}^*(k) \qquad \text{I-10}$$

where $\mu_a$ is an appropriate adaptation step.

1.2.3—Transversal Filters

The signal $v(k)$ can be written more concisely as follows:

$$v(k) = \sum_{i=1}^{P} v_i(k) = B^T(k-1) U(k) \qquad \text{I-11}$$

with:

$$B^T = [B_1^T, B_2^T, \ldots, B_P^T] \qquad \text{I-12}$$

$$U^T(k) = [U_{1,L+1}^T(k), U_{2,L+1}^T(k), \ldots, U_{P,L+1}^T(k)] \qquad \text{I-13}$$

The criteria used for updating are, in non-limiting manner, those of Godard [6], of Shalvi & Weinstein [8], or of Shtrom & Fan [11]. Purely by way of indication, it is recalled that the cost function defined by Godard is as follows:

$$J_G(B) = E\{[|v(k)|^p - R_p]^2\} \text{ with } R_p = \frac{E\{|d(k)|^{2p}\}}{E\{|d(k)|^p\}} \qquad \text{I-14}$$

In practice, the parameter $p$ is selected to be equal to 2, but other values are also possible. The criterion proposed by Shalvi & Weinstein is the following:

$$J_{SW}(B) = E\{|v(k)|^4\} \text{ with the constraint } E\{|v(k)|^2\} = \sigma_d^2 \qquad \text{I-15}$$

Shtrom and Fan have proposed various cost functions that can also be used for updating the transversal filters and that are fully described in [11]. In general, the algorithms which stem from those criteria are described in the articles cited by way of reference, at least in their stochastic gradient version. For purely illustrative purposes, it is recalled that the updating relationship that stems from Godard's algorithm for p=2 is as follows:

$$B_i(k) = B^i(k-1) - \mu_b v(k) [|v(k)|^2 - R_2] U_{i,L+1}^*(k) \qquad \text{I-16}$$

for i=1, 2, . . . , P where $\mu_b$ is a suitable adaptation step.

As already mentioned, and purely by way of indication, the reference coefficient can be selected to be equal to 1/P for each of the filters $B_i$, and its position is left free. In practice, the positions of these coefficients, which determines the payback delay of the equalizer is selected so that these filters tend to be somewhat anticausal.

1.2.4—Phase Correction

One possible criterion is minimizing the estimated MQE (on the basis of decided data). Clearly, this criterion is then controlled by decisions and is therefore less robust, which is why the device is positioned at the downstream end of the system so as to avoid disturbing the upstream stages. The cost function is then expressed as follows:

$$K(\theta) = E\{|v(k) e^{-j\hat{\theta}(k-1)} - \hat{d}(k)|^2\} \qquad \text{I-17}$$

The updating algorithm which stems therefrom is as follows:

$$\epsilon(k) = Im\{w(k)[\hat{d}(k) - w(k) - w(k)]^*\} \qquad \text{I-18}$$

$$e(k) = (\epsilon \otimes f)(k) \text{ and } Z\{f(k)\} = G_1 + \frac{G_2}{1 - z^{-1}} \qquad \text{I-19}$$

$$\hat{\theta}(k) = \hat{\theta}(k-1) + \mu_\theta e(k) \qquad \text{I-20}$$

with $\mu_\theta$ is an appropriate adaptation step.

1.2.5—Automatic Gain Control

Although an automatic gain control device is not essential, it can be advantageous in some cases to provide one. In this case also, given the linearity of the structure, the position of this device can be selected arbitrarily. One suitable position is that shown in FIG. 5. In this case, one possible algorithm for updating gain $g$ corresponds to the following updating equation:

$$G(k) = G(k-1) + \mu_g [\sigma_d^2 - |w(k)|^2] \qquad \text{I-21}$$

$$g(k) = \sqrt{|G(k)|} \text{ or } g(k) = |G(k)| \qquad \text{I-22}$$

with $G(0)=1$ and $\mu_g$ being an appropriate adaptation step while $\sigma_d^2$ designates the variance of the data transmitted by the source.

Another solution that is also advantageous in terms of stability is to situate the AGC characterized by g upstream from the purely recursive filters having the transfer function $1/[1+A(z)]$. One possible algorithm for updating gain g then corresponds to the following updating equation:

$$G(k) = G(k-1) + \mu_g \left[ \sigma_d^2 - \sum_{i=1}^{P} |u_i(k)|^2 \right] \qquad \text{I-21bis}$$

$$g(k)=\sqrt{G(k)} \text{ or } g(k)=|G(k)| \qquad \text{I-22bis}$$

2) Switchover Rule

To determine which mode of operation to use (convergence or tracking), a signal for evaluating the performance of the equalizer is generated in line. To do this, for example, it is possible to determine the estimated MQE $M_{DD}(k)$ using the following algorithm:

$$M_{DD}(k)=\lambda M_{DD}(k-1)+(1-\lambda)|\hat{d}(k)-w(k)|^2 \qquad \text{I-23}$$

or any other cost function generated on the same principle, for example and to illustrate this concept, Godard's function [6] estimated as follows:

$$E_G(k)=\lambda E_G(k-1)+(1-\lambda)[|v(k)|^p-R_p]^2 \qquad \text{I-24}$$

where $\lambda$ designates a forgetting factor.

When estimated MQE is used as the control signal, configuration is selected by implementing the following algorithm:

$$\begin{cases} M_{DD}(k_0) \geq M_0 \text{ of convergence mode if } k > k_0 \\ M_{DD}(k_0) < M_0 \text{ using tracking mode if } k > k_0 \end{cases} \qquad \text{I-25}$$

In other words, so long as the estimated MQE $M_{DD}(k)$ is greater than a threshold $M_0$, then the equalizer is in convergence mode, whereas, when it is less than $M_0$, then the equalizer is in tracking mode.

It can be seen that under such circumstances the estimated MQE is very close to the true MQE. To ensure a safe transition to DSE mode, the threshold must be selected to be small enough. In addition, and in general, when MQE decreases, the probability of error also decreases. It is thus appropriate to determine a threshold corresponding to a binary error rate (BER) that is small enough, typically of the order of 0.02 so as to avoid pathological behavior of the equalizer. If it is assumed that in its convergence mode the equalizer is of the zero-forcing type, then the BER can be expressed as a function of the MQE. Thus, with 4-level quadrature amplitude modulation (4-QAM), such a constraint leads to selecting a threshold $M_0=0.25$ ($-6$ dB). It should be observed that under such circumstances, estimated MQE is generally close to true MQE and thus constitutes, in this respect, a good index of performance for controlling the operating mode used by the equalizer.

3) Tracking Mode and/or Periods of Easy Reception

This mode of operation begins when a signal generated in line such as estimated MQE crosses a threshold matching the modulation used (e.g. 0.25 for quaternary phase-shift keying (QPSK)). Under such circumstances, the positions of the transverse filter and the recursive filter are interchanged so as to obtain a conventional space-time DFE. In other words, the equalizer switches from a linear recursive structure to a non-linear recursive structure and vice versa as a function of the severity of the context. In this mode of operation the criterion is then unique, i.e. minimizing estimated MQE. This criterion is used to update all of the parameters of the equalizer using a recursive least squares or a stochastic gradient type algorithm or any other corresponding algorithm in the present state of the art. The automatic gain control characterized by g is generally locked on its previous value, this function then being performed automatically by the various transversal filters. In contrast, the phase corrector continues to operate, but its position can likewise be modified as shown in the diagram of FIG. 6.

3.1—Operating Equations

The operating equations governing this mode of operation are as follows:

$$p(k) = g(k-1)\exp(-j\hat{\theta}(k-1))\sum_{i=1}^{P} B_i^T(k-1)S_i(k) \qquad \text{II-1}$$

with $$S_i(k)=(s_i(k),s_i(k-1),\ldots,s_i(k-L))^T \qquad \text{II-2}$$

and $$w(k)=p(k)-A^T(k-1)D(k) \qquad \text{II-3}$$

with $$D(k)=(\hat{d}(k-1),\hat{d}(k-2),\ldots,\hat{d}(k-N))^T \qquad \text{II-4}$$

3.2—Updating Parameters in Tracking Mode 3.2.1—Transversal Filters

The equations for updating the filters $B_i(z)$ of the space-time equalizer then become:

$$B_i(k)=B_i(k-1)+\mu_b g(k-1)\exp(j\hat{\theta}(k-1))$$
$$[\hat{d}(k)-w(k)]S^*_i(k) i=1,2,\ldots,P \qquad \text{II-5}$$

3.2.2—Recursive Filter $$A^T(k)=A^T(k-1)-\mu_a[\hat{d}(k)-w(k)]D^*(k) \qquad \text{II-6}$$

3.2.3—Phase Corrector

The updating algorithm is as follows:

$$\epsilon(k)=Im\{p(k)[\hat{d}(k)-w(k)]^*\} \qquad \text{II-7}$$

$$e(k) = (\epsilon \otimes f)(k) \text{ and } Z\{f(k)\} = G_1 + \frac{G_2}{1-z^{-1}} \qquad \text{II-8}$$

$$\hat{\theta}(k)=\hat{\theta}(k-1)+\mu_\theta e(k) \qquad \text{II-9}$$

with an appropriate adaptation step $\mu_\theta$.

Special Case

It is important to observe that with binary phase-shift keying (BPSK) the optimum quadratic criterion is minimizing the following cost function:

$$MQE_{bpsk}=E\{[Re\{w(k)-\hat{d}(k)\}]^2\}$$

The equations which stem therefrom can then be deduced directly without any particular difficulty. With BPSK this criterion is more pertinent than quadratic criteria. In addition, in convergence mode, the pertinent criterion for adapting the vector A of the recursive filter is minimizing the following cost function:

$$E\{\operatorname{Re}\{|u_1(k)|^2\} + \ldots + \operatorname{Re}\{|u_p(k)|^2\}\} = \sum_{i=1}^{P} E\{\operatorname{Re}\{|u_i(k)|^2\}\}$$

under the reserve of constraining the coefficients of the vector to be real.

The equations which stem therefrom can be obtained directly. The other criteria are similar in all points to the preceding criteria except concerning phase correction which minimizes $MQE_{bpsk}$.

Both operating modes of a self-learning space-time DFE constituting a possible embodiment of the invention are described above. The above-described implementations of updating stem from the stochastic gradient algorithm. Naturally, they could also be obtained using a technique of the least squares type, the fast least squares type, or any other technique corresponding to the present state of the art.

The performance level reached by this device is remarkable in the event of the channel becoming degraded, since the device then automatically configures itself in convergence mode. In contrast, as soon as the channel improves, as detected from an in-line signal, our device configures itself in tracking mode, and so on.

Figure 21:
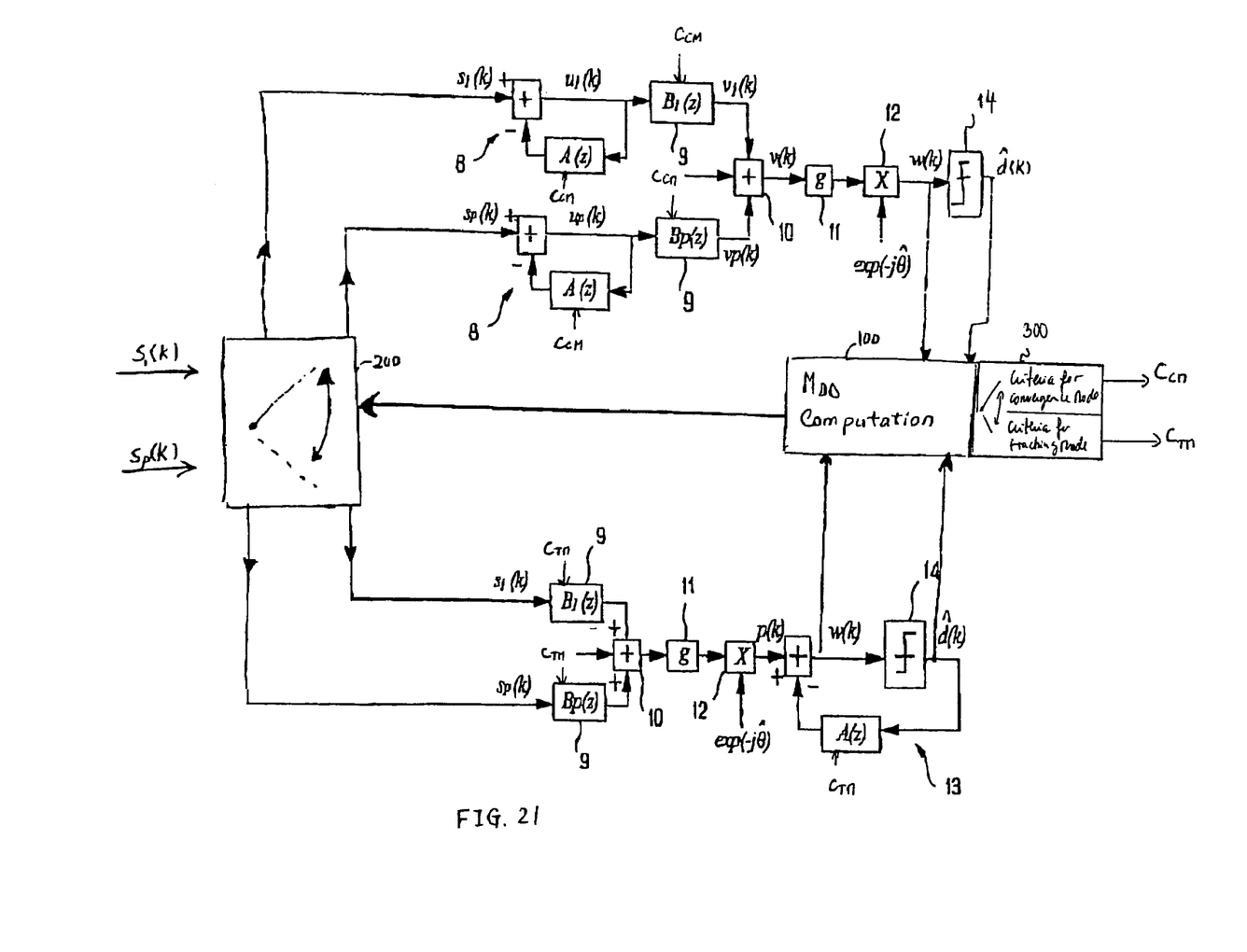
FIG. 21 shows an embodiment of an equalizer corresponding to FIGS. 5 and 6 in combination.

FIG. 21 shows an embodiment of an equalizer corresponding to FIGS. 5 and 6 in combination. In FIG. 21, a decision taking means ($M_{DD}$ computation 100) evaluates the function of the output signal and a switch 200 responds to the result of the evaluation. Switch 200 performs the switching operation from the normal operation mode to the convergence mode. FIG. 21 also shows a modifier 300 that modifies criteria for updating the transversal filters and the recursive portion of the equalizer device depending on whether the equalizer device is operating in the normal mode or in the convergence or difficult reception mode.

Finally, the above-described equalizer principle constituting the subject matter of the invention can be extended to equalizers that are of the fractionally-spaced type, i.e. that use samples that are spaced apart in time by a unit time interval of less than T, e.g. T/2.

Figure 7:
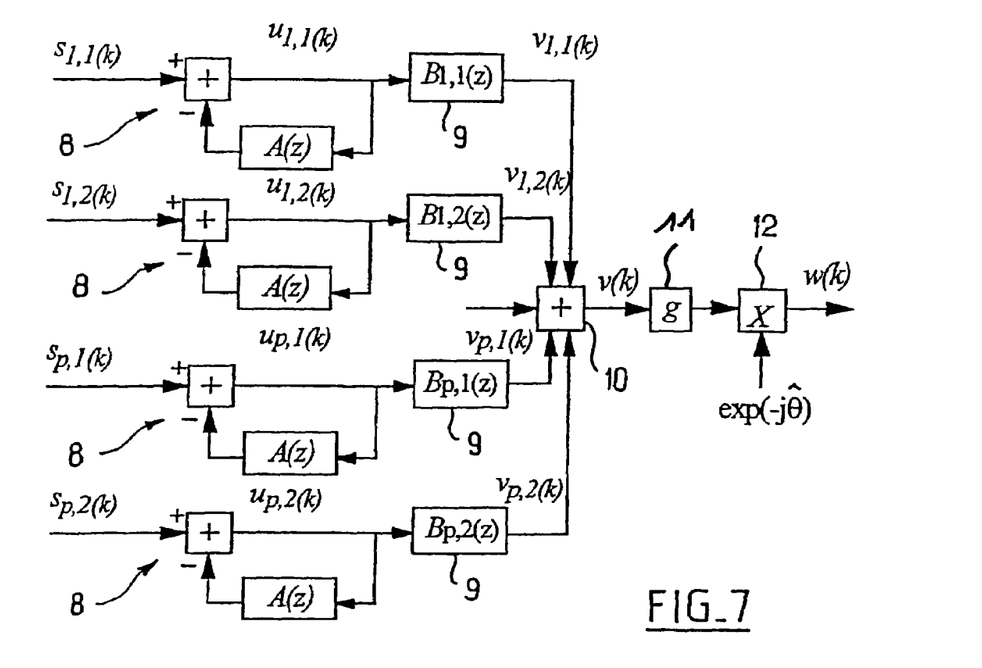
FIG. 7 is a diagram showing the convergence mode structure of a fractionally-spaced space-time equalizer in accordance with a possible embodiment of the invention.
Figure 8:
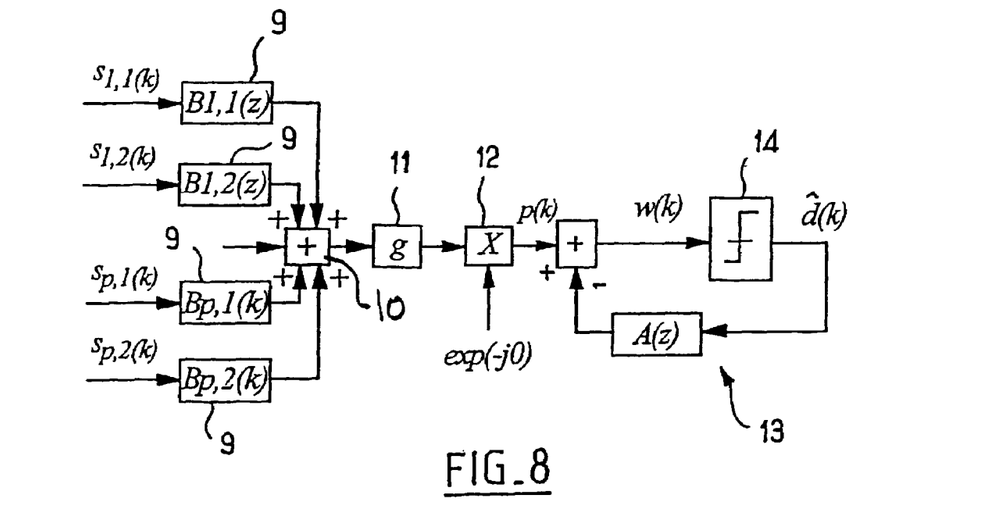
FIG. 8 is a diagram showing the convergence mode structure of a fractionally-spaced space-time equalizer in accordance with a possible embodiment of the invention.
Figure 9:
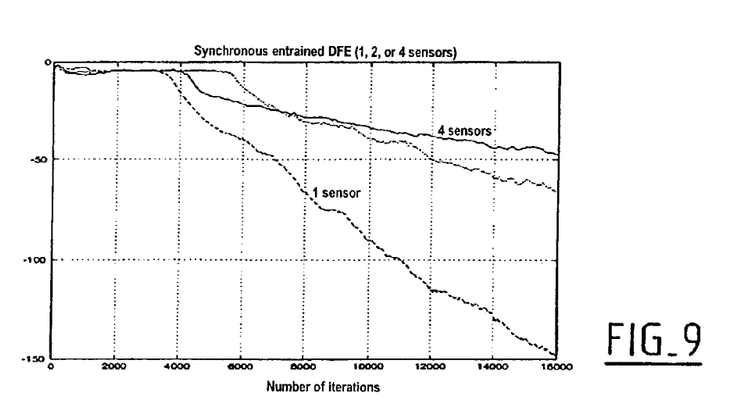
FIGS. 9 to 11 are graphs respectively plotting curves of mean quadratic error, of output from the correlator, and also of input and output constellations for a synchronous entrained decision feedback equalizer for one, two, and four received channels.
Figure 10:
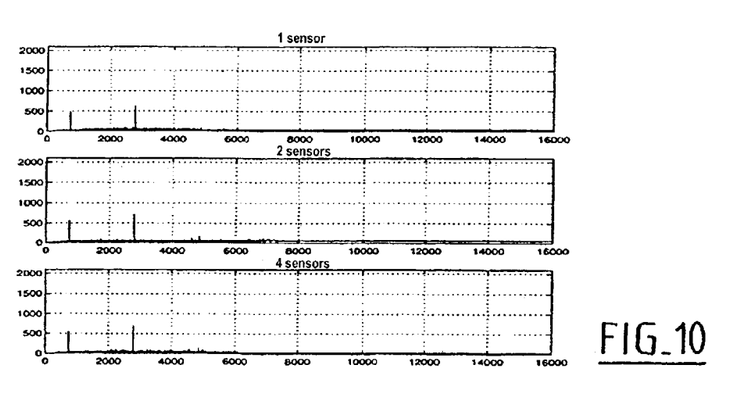
Figure 11:
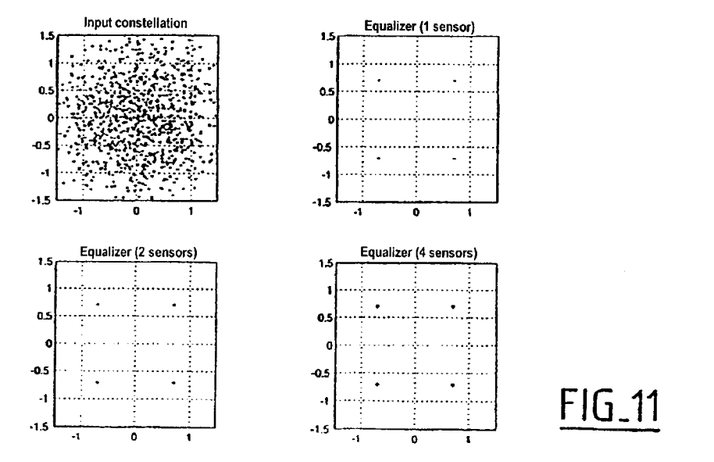
Figure 12:
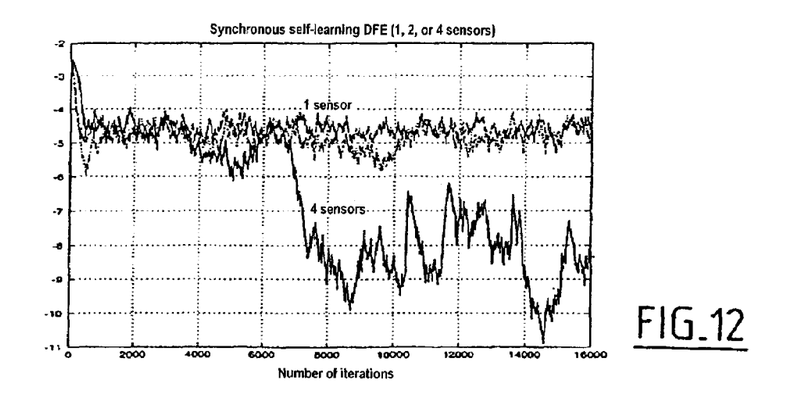
FIGS. 12 to 14 are graphs respectively plotting curves of mean quadratic error, of output from the correlator, and also of input and output constellations for a synchronous self-learning decision feedback equalizer for one, two, and four received channels.
Figure 13:
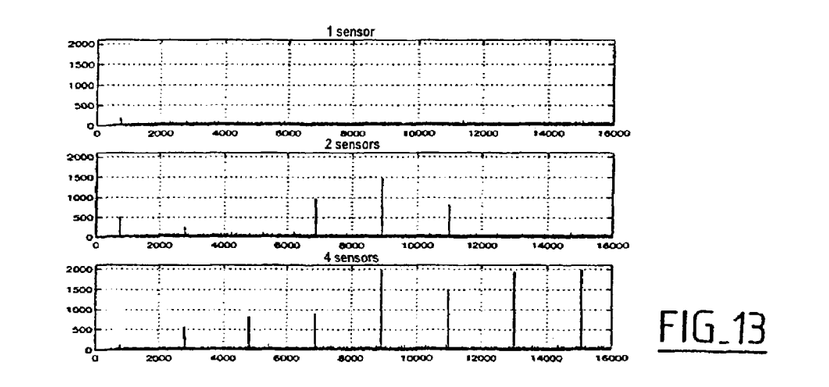
Figure 14:
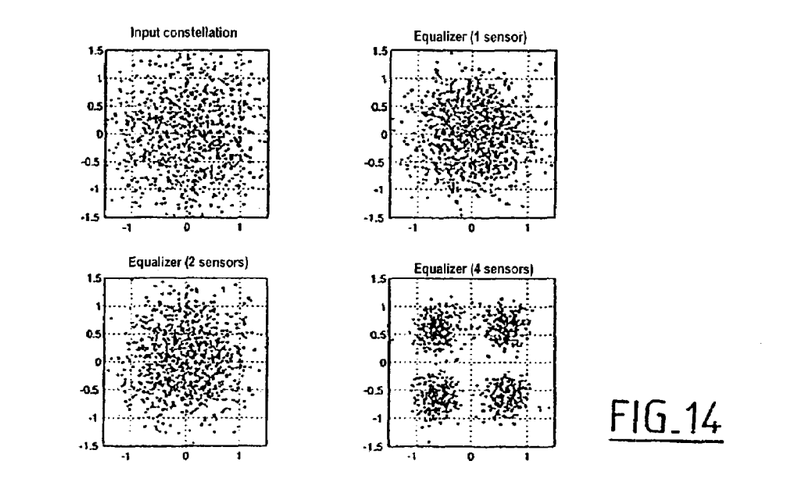
Figure 15:
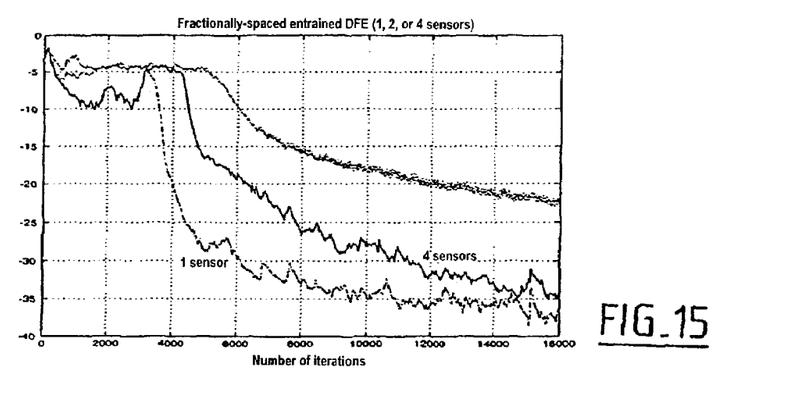
FIGS. 15 to 17 are graphs respectively plotting curves of mean quadratic error, of output from the correlator, and also of input and output constellations for a fractionally spaced entrained decision feedback equalizer for one, two, and four received channels.
Figure 16:
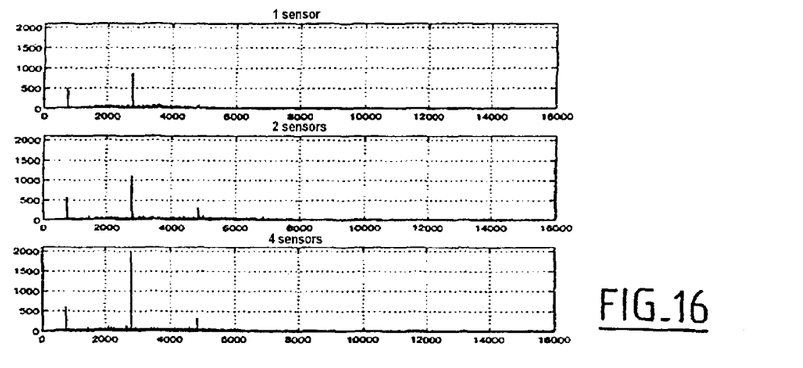
Figure 17:
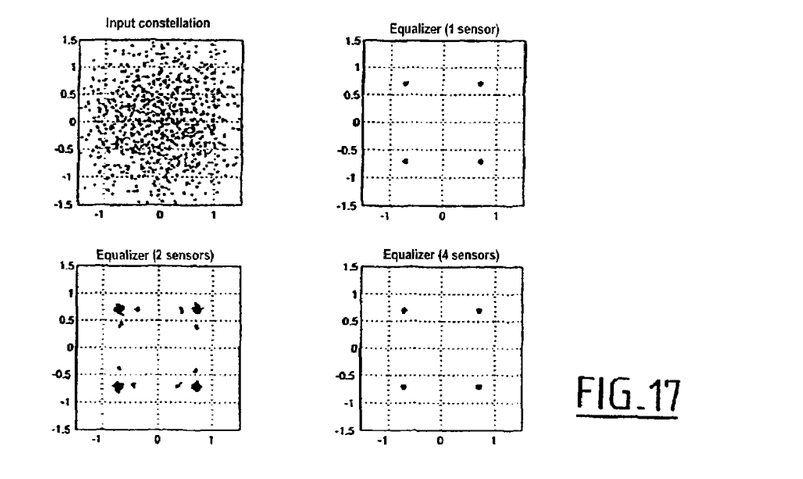
Figure 18:
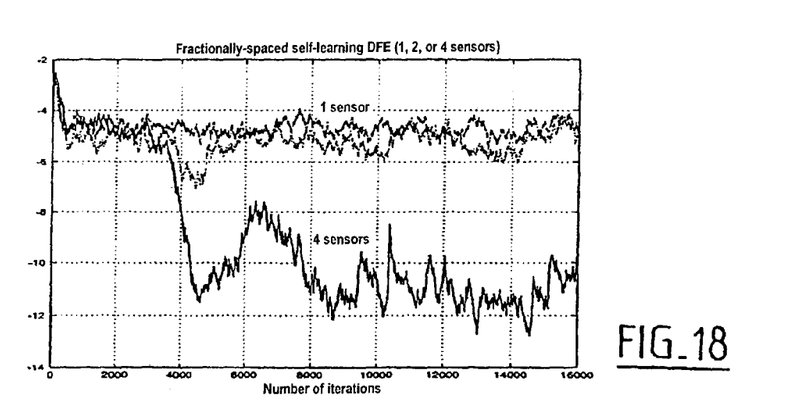
FIGS. 18 to 20 are graphs respectively plotting curves of mean quadratic error, of output from the correlator, and also of input and output constellations for a fractionally spaced self-learning decision feedback equalizer for one, two, and four received channels.
Figure 19:
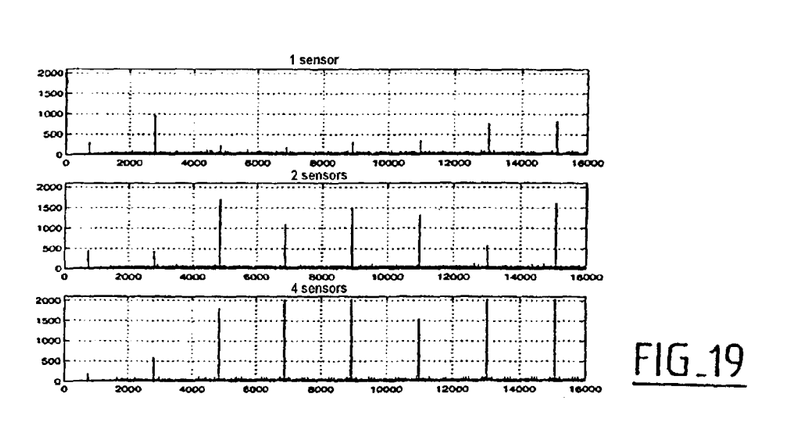
Figure 20:
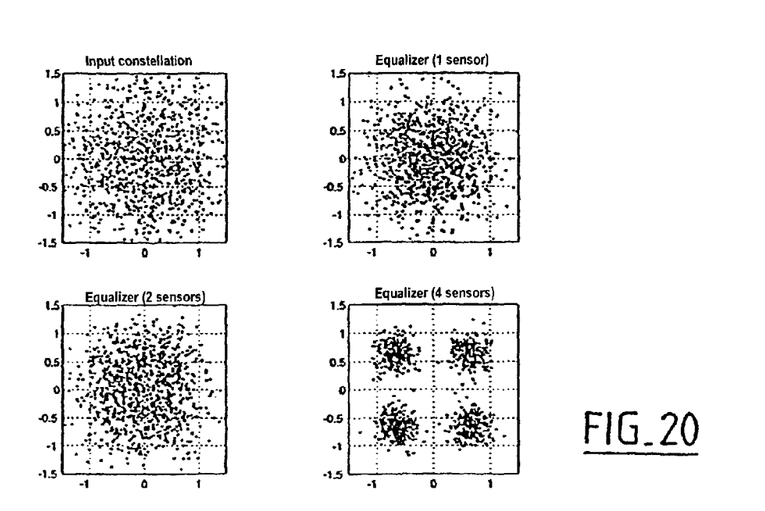

Such a device is fully disclosed by the diagrams of FIGS. 7 and 8. For this purpose, consideration is given to a fractionally-spaced equalizer using samples taken at a rate 2/T, which corresponds to a practice that is very widespread, and the signals $s_{i,j}(k)$ are defined as follows:

$s_{1,1}(k)=s_1[kT]$ $s_{1,2}(k)=s_1[kT-T/2]$ $s_{p,1}(k)=s_p[kT]$ $s_{p,2}(k)=s_p[kT-T/2]$

For the other signals that appear in FIGS. 7 and 8, the notation is based on the same principle.

In tracking mode, the updating equations are those of a conventional fractionally-spaced DFE corresponding to the state of the art. In convergence mode, it suffices to consider the intermediate samples $s_{n,2}(k)=s_n[kT-T/2]$ as coming from a second sensor, whereupon the preceding equations apply in full to the new device and from a general point of view can be considered as constituting a space-time DFE having 2P sensors.

Applications

The above-described device is directly applicable to communications systems operating on a continuous stream of data and to transmission systems operating in packet mode (blocks, bursts). In packet transmission mode, it suffices to reiterate the block equalization process as often as necessary. The basic idea is then very simple. A first pass is performed on the block in question (a packet). Under such conditions, the (equalizer) parameters estimated at the end of this pass are closer to their final values. As a result, the following iteration is performed by initializing the parameters of the device on the values estimated at the end of the preceding iteration, and so on. By performing a certain number of passes, typically four or five, a most exceptional result is achieved. This method of operating makes it possible to work on packet mode transmission systems and, for example, with BPSK, the minimum block size required for this "blind" strategy is about 150 symbols, which is most advantageous and corresponds to the requirements laid down by present standards. This procedure is most advantageous for applications insofar as many present-day systems make use of time division multiple access (TDMA).

Fields covered by the present invention are, in non-exhaustive manner, microwave telecommunications, mobile radio, tropospheric and ionospheric radio, and undersea sound communications. These difficult channels all present the particular feature of being highly unsteady and as a general rule they have impulse responses that are long compared with the symbol time T, thus making it impossible de facto to use optimal receivers of the kind described by G. D. Forney [3]. Similarly, telephone pairs or cables can also be concerned by the device of the invention, it sufficing to set P=1 (only one sensor) and to opt for a fractionally-spaced strategy: under such circumstances, the device can be considered as being a space-time DFE with two sensors. Present proposals for "high data rate" transmission over twisted pairs (XDSL, HDSL, VDSL, etc., where DSL stands for "digital subscriber line") constitute potential applications for this new device.

The types of modulation concerned by this invention are all linear types of modulation and in particular amplitude modulation (pulse amplitude modulation), amplitude modulation on two carriers in quadrature (QAM), phase modulation (MPSK), and certain types of frequency modulation (Gaussian minimum shift keying (GMSK), etc.). Overall, the new device can be adapted to nearly all of the kinds of modulation presently in use.

This new equalizer has already been tested with success on undersea sound communications signals. The results are very convincing, including transmission in packet mode. It is clear that in the present scientific community, blind processing is often unjustly considered as being a technique which, while promising, leads to convergence times that are unacceptable given present applications to transmission in packet mode. In fact, the space-time equalizer of the invention makes it possible to obtain performance that is most advantageous on blocks of modest size. To illustrate these points in the context of undersea sound communications, we have successfully processed blocks of 1000 symbols in a quaternary phase-shift keyed (QPSK) signal at a data rate of 25 kbit/s, with the time span of the impulse response spreading over nearly 60 T, which is enormous. There is no doubt that such results will cause certain practices to be changed, particularly in the field of undersea sound communications where the quantities of information exchanged are sometimes small. In such applications, the techniques presently implemented generally make use of non-coherent receivers, even though it is perfectly possible to envisage coherent reception techniques, i.e. having higher performance, when using packet mode transmission. Naturally, the duration of a packet must be selected in such a manner that the transmission channel can be considered as steady for this horizon.

An Example of an Application

To illustrate the performance of the new device, it is compared with various results obtained in undersea sound communications using a conventional entrained space-time equalizer and using a space-time equalizer of the type described above. The modulation used was of the QPSK type, the carrier frequency with 62 kHz, and the bit rate was 33 kbit/s. The discrete impulse response of the transmission channel had a time span of about 60 T, thus rendering impossible any reception technique that is optimum in the maximum likelihood sense.

With the phase-time equalizer, the synchronous and fractionally-spaced strategies were studied in full, both in entrained mode and in "blind" mode. The training sequence had 1000 symbols. The various graphs show in particular how the estimated MQE varied on the basis of the decided data. In parallel, for each configuration, the signal obtained is shown by passing the decided data d̂(k) through the correlator adapted to the transmitted sequence (a white sequence of maximum length comprising 2047 symbols) when using one, two, or four sensors. Finally, the graphs of the third type show the input and output constellations of the equalizers when they comprise respectively one, two, or four sensors.

The results are given in FIGS. 9 to 20. It can be seen from these figures that the "blind" solution outperforms the entrained solution very considerably, whether in a synchronous version or in a fractionally-spaced version.

Even in its fractionally-spaced version having four sensors (FIG. 16), the entrained space-time equalizer does not manage to produce results. In contrast, using a single sensor, the output from the fractionally-spaced "blind" equalizer shows some pertinence (FIG. 19) as can be seen by the presence of peaks at the output from the correlator, which peaks reflect recognition of the transmitted message.

This trend improves considerably when using two sensors and is confirmed even more clearly when using four sensors.

Thus, on the basis of these few results using a real data file, it can be seen that the space-time DFE of the invention is an innovative technique that provides performance that is most advantageous on the most severe of transmission channels.

The invention claimed is:

1. An equalizer device for digital communications systems having a plurality of receive channels, the equalizer device presenting in normal operation a first structure which comprises a first transversal filter for each receive channel, the first transversal filter being connected to summing means for summing the receive channels, and a system downstream from said summing means including a first phase corrector and a first recursive portion including a single recursive filter and decision circuit in its forward branch, said equalizer device including decision-taking means for evaluating its performance as a function of the output signal from said equalizer device and a switch for responding to the result of this evaluation by switching from the first structure which corresponds to a normal mode of operation, also referred to as a tracking mode or an easy reception mode, to a second structure which corresponds to a convergence mode of operation, also referred to as a difficult reception mode, and vice versa, the second structure including a second recursive portion comprising a purely recursive filter in each receive channel, each purely recursive filter being upstream from a second transversal filter in each receive channel, wherein, in the second structure corresponding to the convergence mode, each purely recursive filter of the plurality of receive channels is identical and is adapted for minimizing a cumulated sum of output powers.

2. The equalizer device according to claim 1, further comprising a modifier for modifying criteria for updating the first and second transversal filters and the first and second recursive portions of the equalizer device depending on whether the equalizer device is operating in the normal mode or in the convergence mode.

3. The equalizer device according to claim 2, wherein, in the convergence mode, the criteria for updating the second recursive portion and the second transversal filters is respectively a quadratic criterion and a statistical criterion of order greater than 2.

4. The equalizer device according to claim 2 or claim 3, wherein, in the tracking or easy reception mode, the criteria is to minimize an estimated mean quadratic error.

5. The equalizer device according to claim 1, wherein performance level of the equalizer device is determined as a function of an estimate of mean quadratic error.

6. The equalizer device according to claim 1, wherein, in the normal operation mode, the first phase corrector is disposed in an immediate vicinity of the decision circuit.

7. The equalizer device according to claim 1, further comprising an automatic gain controller in the first structure and in the second structure.

8. The equalizer device according to claim 7, wherein in the tracking or easy reception mode, the automatic gain controller is constituted by the first transversal filter.

9. The equalizer device according to claim 7, wherein in the convergence mode, the automatic gain controller is situated downstream from the second recursive portion and upstream from a second phase corrector.

10. The equalizer device according to claim 1, wherein data received by the equalizer device is sampled once per symbol duration.

11. The equalizer device according to claim 1, wherein data received by the equalizer device is fractionally-spaced over the plurality of receive channels.

12. The equalizer device according to claim 1, wherein the equalizer device receives a continuous data stream.

13. The equalizer device according to claim 1, wherein the equalizer device receives packetized data.

* * * * *

UNITED STATES PATENT AND TRADEMARK OFFICE
CERTIFICATE OF CORRECTION

PATENT NO. : 7,251,274 B1 Page 1 of 1
APPLICATION NO. : 10/148142
DATED : July 31, 2007
INVENTOR(S) : Labat et al.

It is certified that error appears in the above-identified patent and that said Letters Patent is hereby corrected as shown below:

Col. 1, Line 56 in the Description of the General Field of the Invention and of the State of the Art, please delete "IST" and insert -- ISI --.

Col. 16, Line 37, in Claim #6, please delete "normal operation" and insert -- convergence --.

Signed and Sealed this

Twentieth Day of May, 2008

JON W. DUDAS
*Director of the United States Patent and Trademark Office*